A. H. INGLE.
AXLE LATHE.
APPLICATION FILED MAR. 3, 1917.
1,288,903.
Patented Dec. 24, 1918.
2 SHEETS—SHEET 2.
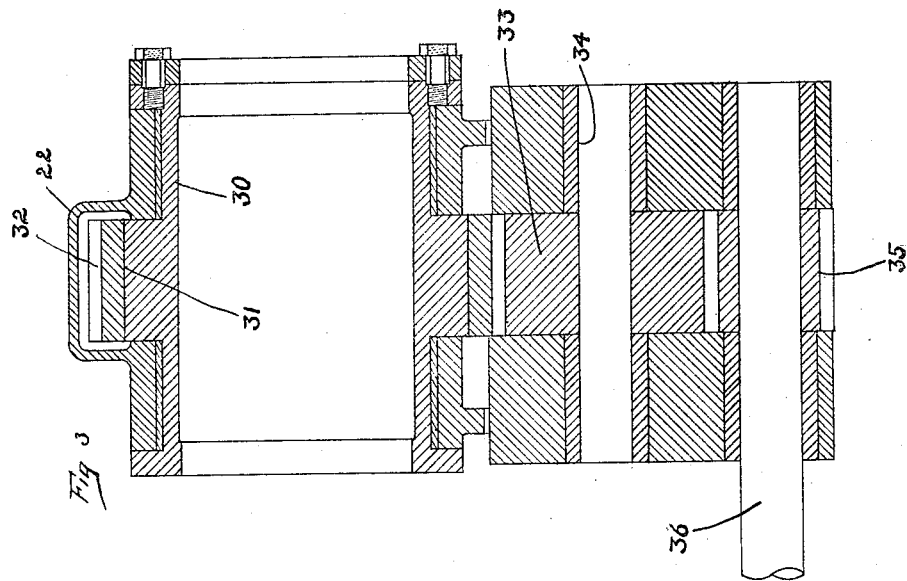
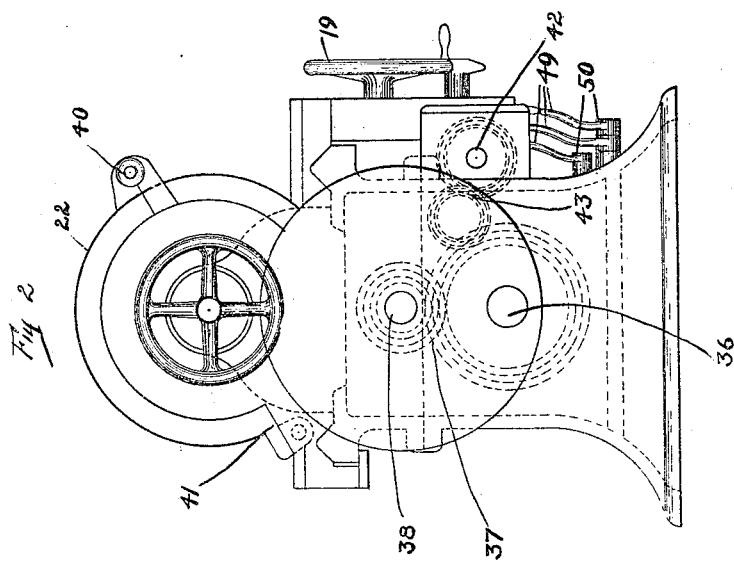
Inventor
Arthur H. Ingle,
by Clyde L. Rogers
his Atty.

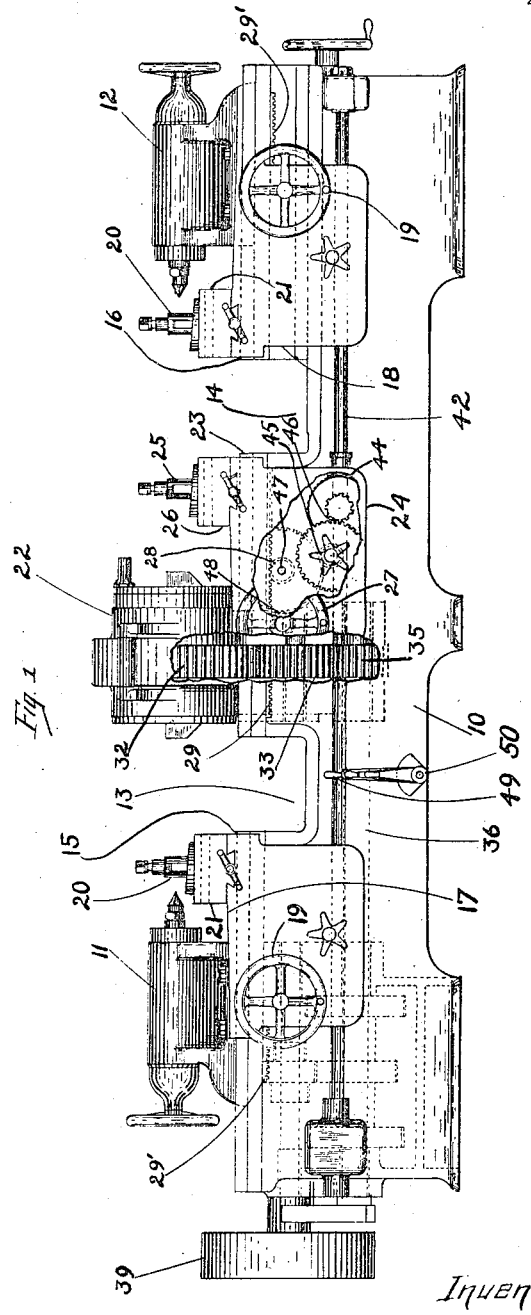

UNITED STATES PATENT OFFICE.

ARTHUR H. INGLE, OF ROCHESTER, NEW YORK.

AXLE-LATHE.

1,288,903. Specification of Letters Patent. Patented Dec. 24, 1918.

Application filed March 3, 1917. Serial No. 152,383.

*To all whom it may concern:*

Be it known that I, ARTHUR H. INGLE, a citizen of the United States, and resident of Rochester, county of Monroe, State of New York, have invented an Improvement in Axle-Lathes, of which the following description, in connection with the accompanying drawings, is a specification, like characters on the drawings representing like parts in each of the several views.

This invention relates to lathes of the type especially designed for turning axles such as railway car axles, and truing the journals of such axles, and like uses. In machines of this kind it is customary to provide tail stocks having dead centers to engage the opposite ends of the axle with a central hollow drive gear within which the axle is chucked for rotation, and with carriages for the turning tools suitably mounted to turn down the axles or true the journals as required. In machines of this kind that are adapted for truing journals of axles having wheels fixed thereon it is requisite to have tool carriages mounted for operation both outside the wheels in order to true external journals and also to have a carriage or carriages mounted between the wheels for truing such axles as may have journals inside the wheels. Since gaps must be formed in the lathe bed, spaced apart so as to afford clearance for the car wheels, it follows that both the center drive for the axle and whatever intermediate tool carriage construction is provided, must be located in this limited space between the two lathe gaps or openings. In prior machines known to me it has been customary to mount the center drive for the axle midway between the gaps in the lathe bed and mount tool carriages at the sides of such center drive. This has required that the tool carriages so mounted be relatively narrow and with a small range of operative movement and adjustment on account of the restricted space within which these carriages could operate and it has further resulted that in order to provide any adequate space at all for mounting and moving such tool carriages, that the center drive had to be unduly narrowed and therefore not easily made of the requisite strength and rigidity. A prime object of the present invention is to provide an improved construction of axle lathe of this type having spaced apart gaps in the lathe bed for receiving the car wheels as fixed on standard car axles, and provided with an improved construction and relative arrangement of the center drive and intermediate cutter carriage whereby a wider carriage with a longer range of adjustment is obtained, and also a wider and more substantial center drive permitted. My invention is specially adapted for convertible uses in turning down either axles without wheels, or truing either external or inside journals as required. The foregoing and other objects and features of the invention will be better understood from the following detailed description taken in connection with the accompanying drawings and will be thereafter pointed out in the appended claims.

Referring to the drawings:

Figure 1 is a side elevation of a machine constructed in accordance with my invention, a part being broken away to show interior construction;

Fig. 2 is an end view of the machine; and

Fig. 3 is an enlarged lengthwise vertical section showing the operative connections to the center drive.

The lathe bed is indicated at 10 equipped with tail stocks having dead centers 11, 12, adjustably fitted adjacent its opposite ends, and having intermediate gaps 13, 14 spaced apart the proper distance to receive and provide clearance for car wheels fixed on a standard axle. The lathe bed outside of these gaps is formed with usual carriage ways 15, 16 to receive tool carriages 17, 18 respectively, these carriages being adjustable along said ways in any usual or suitable way with hand adjusting wheels 19, and having usual tool posts 20 carried on cross-feed slides 21. In accordance with my invention a housing and bearing support 22 for the hollow central drive sleeve is mounted at one side of the space between the gaps 13, 14, *i. e.*, in offset relation so that it is adjacent the gap 13 as seen in Fig. 1 and thus although of substantial width, it extends only about midway of the space between the gaps. Thus a large portion of the space between the gaps 13, 14 is left to provide ways 23 along which an intermediate tool carriage 24 of substantial width may be mounted for operative movement and adjustment. This carriage may be equipped with a tool post 25 mounted on a cross-feed slide 26 similarly to the other tool posts, and the carriage 24 may have provision for manual adjustment by means of a hand wheel 27 which is connected to operate a pinion 28 engageable with a rack 29 on the lathe bed; this corresponding to the similar racks 29' through which the adjustment of the outer tool carriages 17, 18 is effected. The center driving element is formed as a tubular sleeve 30 journaled in the housing bearing 22 and having an intermediate peripheral boss 31 to which is fixed a gear ring 32 engageable by an intermediate pinion 33 carried on a stud shaft bearing 34 and in driven engagement with a pinion 35 on the driving shaft 36 which extends out to the left end of the machine as seen in Fig. 1 where it is driven through change gearing 37 from a prime drive shaft 38 on which is mounted a driving pulley 39. The bearing housing 22 is shown as hinged at 40 with the upper portion arranged to swing up from the connection 41 where the parts are normally locked together, to permit placing of the axles to be trued, in operative position. For this purpose the sleeve 30 may be removed after this swinging up of the upper part of the housing 22 and positioned on the axle after which it may be re-located in operative relation as the axle is brought to operative position; this however being merely illustrative and typifying any suitable means of positioning the axle within the tubular sleeve. For feeding and traversing the tool carriages by power, a feed shaft 42 is mounted along the side of the bed driven by change gearing 43 from the gearing 37 and prime drive shaft 38. The transmission from this feed shaft for operating the carriages may be of any suitable form but it is herein shown for each carriage as consisting of bevel gearing 44 which is adapted to be connected at will to the shaft by a clutch 45 and transmitting through reducing spur gearing 46 to a shaft 47 bearing the pinion 28 which as described is in mesh with the rack 29; this pinion 28 being also operable from the hand wheel 27 through the spur pinion and gear connection 48.

It will be understood that with my improved construction, axles without wheels can be turned throughout the end portions thereof and that on axles equipped with wheels the machine is adapted to true journals either inside or outside the wheels with equal facility. This is a valuable feature in shops where there is not much work in the line of truing of journals, but considerable for turning axles, or vice versa, since the adaptability of the machine as described renders it readily capable of performing all the work of separate machines hitherto used for these purposes. It will be noted that in the space between the gaps 13, 14, which as explained, is a fixed quantity determined by the spacing apart of the car wheels, by my improved construction not only am I enabled to provide an intermediate carriage 24 of much wider dimension and therefore having more adequate and rigid support on its ways as well as an extended range of adjustment, but I am also enabled to make the central drive member much wider and more substantial than is the case where this drive member is mounted centrally between the gaps as has hitherto been usual. The present construction also permits the intermediate carriage 24 to be moved back out of the way when the end carriage, as the carriage 18, is run in to close the gap 14 as occurs in the operation of turning axles without wheels. The intermediate carriage 24 may also be run outward to close this gap with the tool thereon operating to turn down this portion of the axle. In practice the tubular sleeve 30 is of course equipped with suitable means for engaging the axle to turn the same, such means being not herein exhibited since it forms no part of the present invention. I show at 49 three levers adjacently fulcrumed at 50 which may in practice be connected to control the feeds, the speeds, and the driving clutch of the machine, but as these form no part of the present invention the connections thereof are not herein further exhibited. I am aware that the invention may be embodied in other specific forms without departing from the spirit or essential attributes thereof, and I therefore desire the present embodiment to be considered as illustrative and not restrictive, reference being had to the appended claims rather than to the foregoing description to indicate the scope of the invention.

Having described my invention, what I claim as new and desire to secure by Letters Patent is:

1. An axle lathe, comprising a lathe bed having carriage slide ways interrupted by spaced apart gaps to provide wheel clearance, axle rotating means mounted on said bed between said gaps offset from the center of the intervening space and adjacent one of said gaps, and a tool carriage mounted for operative movement in the remaining portion of the space between said gaps.

2. An axle lathe, comprising a lathe bed having carriage slide ways interrupted by spaced apart gaps to provide wheel clearance, axle centering means mounted adjacent each end of the lathe, axle rotating means mounted on the lathe bed at one side of the space between said gaps, and a tool carriage mounted for operative movement on the other side of the space between said gaps.

3. An axle lathe, comprising a lathe bed having carriage slide ways interrupted by spaced apart gaps to provide wheel clearance, axle rotating means mounted on said bed at one side of the space between said gaps, a tool carriage mounted for operative movement on the other side of the space between said gaps, and tool carriages mounted to operate on said bed outside of said gaps, certain of said carriages having a range of operative movement adapted to extend across and bridge one of said gaps.

4. An axle lathe, comprising a lathe bed having carriage guiding ways interrupted by spaced apart gaps to provide wheel clearance, axle centering means at the ends of said bed, a relatively wide tubular member equipped with driving means and constituting axle rotating mechanism mounted at one side of the space between said gaps, and a relatively wide tool carriage mounted for operative movement on said ways at the other side of the space between said gaps.

5. An axle lathe, comprising a lathe bed having carriage guiding ways interrupted by spaced apart gaps to provide wheel clearance, axle centering means at the ends of said bed, a relatively wide tubular member equipped with driving means and constituting axle rotating mechanism mounted at one side of the space between said gaps, and a relatively wide tool carriage mounted for operative movement on said ways at the other side of the space between said gaps, said carriage having a range of operative movement adapted to bridge the gap adjacent thereto.

6. An axle lathe, comprising a lathe bed having carriage slide ways interrupted by spaced apart gaps to provide wheel clearance, axle centering means mounted adjacent the respective ends of said bed, a relatively wide tubular member equipped with driving means mounted on said bed at one side of the space between said gaps, a relatively wide tool carriage mounted on said ways at the other side of the space between said gaps, and other tool carriages mounted on said ways outside of said gaps.

In testimony whereof, I have signed my name to this specification.

ARTHUR H. INGLE.

Copies of this patent may be obtained for five cents each, by addressing the "Commissioner of Patents, Washington, D. C."